(12) United States Patent
Charron

(10) Patent No.: US 6,973,721 B2
(45) Date of Patent: Dec. 13, 2005

(54) TENSION-RESISTANT CONNECTION BETWEEN A SHIELDED HEATING CABLE AND A POWER SUPPLY CABLE

(75) Inventor: Philippe Charron, Boucherville (CA)

(73) Assignee: 6179142 Canada Inc., Longueuil (CA)

( * ) Notice: Subject to any disclaimer, the term of this patent is extended or adjusted under 35 U.S.C. 154(b) by 18 days.

(21) Appl. No.: 10/770,243

(22) Filed: Feb. 2, 2004

(65) Prior Publication Data

US 2005/0166394 A1    Aug. 4, 2005

(51) Int. Cl.[7] .......................................... H01R 43/00
(52) U.S. Cl. ............................. 29/872; 29/869; 29/854; 29/857; 29/868; 29/828; 174/73.1; 174/78
(58) Field of Search .......................... 29/854, 857, 868, 29/869, 870, 871, 872, 873, 825, 828, 33 F; 174/73.1, 79, 78, 74 R, 75 R, 75 B, 75 D, 174/75 F, 75 C

(56) References Cited

U.S. PATENT DOCUMENTS

| | | | |
|---|---|---|---|
| 1,241,809 A | | 10/1917 | Beardsley et al. |
| 2,276,571 A | | 3/1942 | Grypma |
| 2,452,823 A | * | 11/1948 | Wright ..................... 174/88 R |
| 2,756,402 A | * | 7/1956 | Haworth et al. ............ 439/447 |
| 3,691,505 A | * | 9/1972 | Graves ....................... 338/214 |
| 4,025,145 A | * | 5/1977 | Shaffer et al. .............. 439/610 |
| 4,207,429 A | * | 6/1980 | Ward ......................... 174/88 R |
| 4,670,980 A | * | 6/1987 | Charlebois et al. ........... 29/869 |
| 4,710,593 A | * | 12/1987 | Hall et al. ................. 174/88 R |
| 5,221,815 A | * | 6/1993 | Bostock et al. .......... 174/84 R |
| 5,477,507 A | * | 12/1995 | Kaplan ....................... 367/191 |

\* cited by examiner

*Primary Examiner*—Rick Kiltae Chang
(74) *Attorney, Agent, or Firm*—Fay Kaplun & Marcin, LLP

(57) ABSTRACT

An electrical and mechanical connection between (a) a first shielded cable including a metal sheath and electrical conductors and (b) a second cable including a ground conductor and electrical conductors, comprises a zone of interconnection between the first and second cables. In this interconnection zone, a first connection is made between the free end of the metal sheath and the free end of the ground conductor, and second connections are made between the free ends of the electrical conductors of the first cable and the free ends of the electrical conductors of the second cable, respectively. Still in the interconnection zone, the interconnected metal sheath and ground conductor have a first length shorter than second lengths of the interconnected electrical conductors of the first cable and electrical conductors of the second cable whereby, in operation, longitudinal tension in the interconnection zone is totally supported by the interconnected metal sheath and ground conductor.

8 Claims, 1 Drawing Sheet

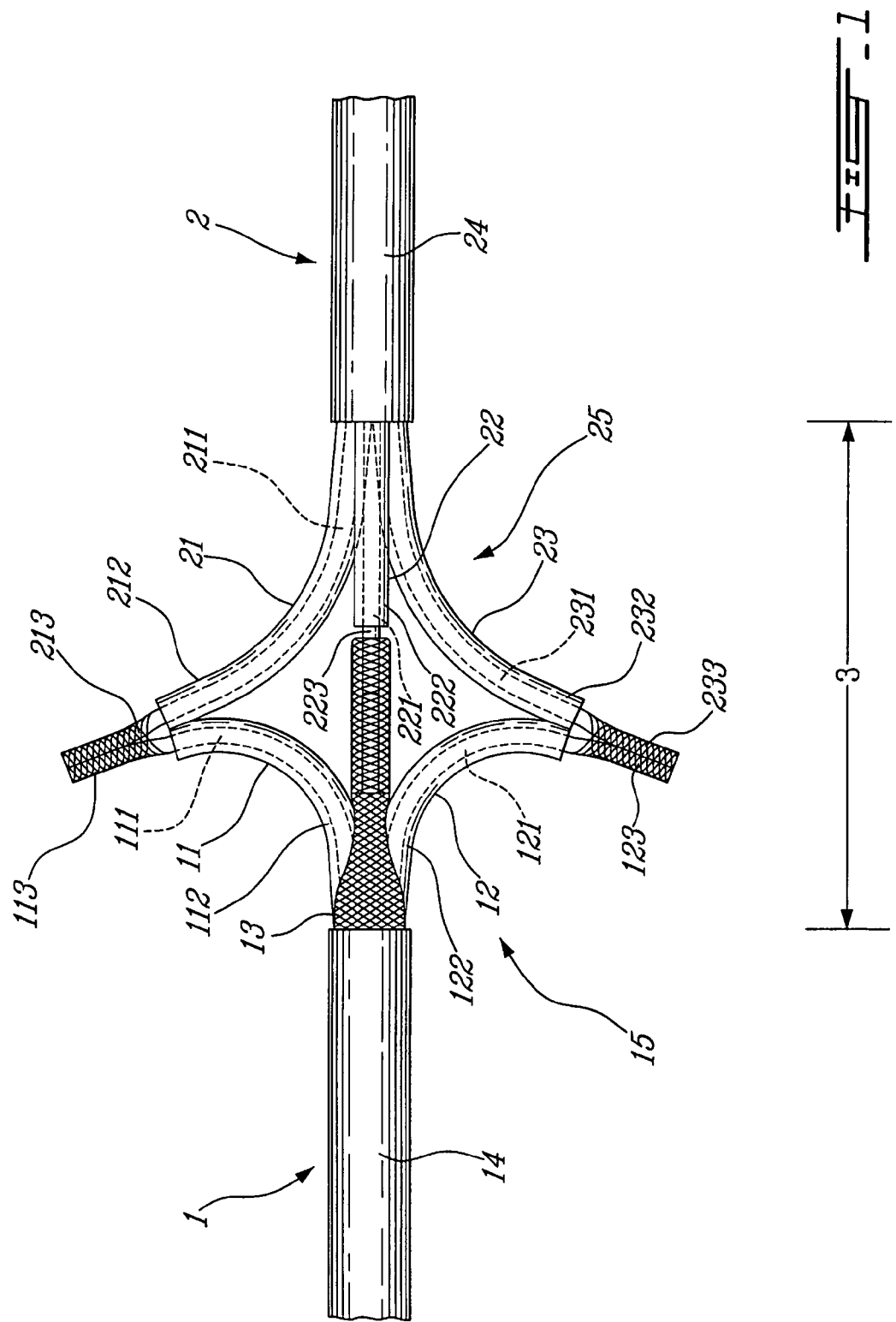

TENSION-RESISTANT CONNECTION BETWEEN A SHIELDED HEATING CABLE AND A POWER SUPPLY CABLE

FIELD OF THE INVENTION

The present invention relates to a tension-resistant electrical and mechanical connection between multi-conductor cables.

BACKGROUND OF THE INVENTION

U.S. Pat. No. 2,452,823 granted to Wright on Nov. $2^{nd}$, 1948 describes a splice between free ends of two shielded cables. More specifically, the two cables each comprise multiple current-carrying conductors enclosed within a wire braid.

The cable splice of Wright requires stripping of the insulation from the free ends of the conductors. Each pair of conductors from the two cables are connected by means of a splicing tube and then individually insulated. A braided wire sleeve is then drawn over the spliced portion of the conductors. The sleeve is then extended longitudinally to cause it to engage the splice, and is then lashed firmly in place with a lashing wire. Finally, the sleeve is securely lashed to portions of the wire braids and connects them mechanically.

The cable splice of U.S. Pat. No. 2,452,823 is not only complex but does not allow the wire braids of the two cables to efficiently and totally support a longitudinal tension applied to the cable splice.

SUMMARY OF THE INVENTION

The present invention relates to a method of electrically and mechanically connecting (a) a first shielded cable comprising a metal sheath and electrical conductors with (b) a second cable comprising a ground conductor and electrical conductors. The method comprises:
  connecting, in a zone of interconnection between the first and second cables, a free end of the metal sheath with a free end of the ground conductor;
  connecting, in the interconnection zone, free ends of the electrical conductors of the first cable with free ends of the electrical conductors of the second cable, respectively; and
  making, in the interconnection zone, a length of the interconnected metal sheath and ground conductor shorter than lengths of the interconnected electrical conductors of the first cable and electrical conductors of the second cable whereby, in operation, longitudinal tension in the interconnection zone is totally supported by the interconnected metal sheath and ground conductor.

The present invention also relates to an electrical and mechanical connection between (a) a first shielded cable comprising a metal sheath and electrical conductors and (b) a second cable comprising a ground conductor and electrical conductors. The electrical and mechanical connection comprises:
  a zone of interconnection between the first and second cables;
  in the interconnection zone, a first connection between a free end of the metal sheath and a free end of the ground conductor; and
  in the interconnection zone, second connections between free ends of the electrical conductors of the first cable and free ends of the electrical conductors of the second cable, respectively;
  wherein, in the interconnection zone, the interconnected metal sheath and ground conductor have a first length shorter than second lengths of the interconnected electrical conductors of the first cable and electrical conductors of the second cable whereby, in operation, longitudinal tension in the interconnection zone is totally supported by the interconnected metal sheath and ground conductor.

The present invention further relates to a method of electrically and mechanically connecting (a) a shielded heating cable comprising a metal sheath and heating wire elements with (b) a power supply cable comprising a ground conductor and power supply conductors. The method comprises:
  connecting, in a zone of interconnection between the shielded heating cable and the power supply cable, a free end of the metal sheath with a free end of the ground conductor;
  connecting, in the interconnection zone, free ends of the heating wire elements with free ends of the power supply conductors, respectively; and
  making, in the interconnection zone, a length of the interconnected metal sheath and ground conductor shorter than lengths of the interconnected heating wire elements and power supply conductors whereby, in operation, longitudinal tension in the interconnection zone is totally supported by the interconnected metal sheath and ground conductor.

The present invention still further relates to an electrical and mechanical connection between (a) a shielded heating cable comprising a metal sheath and heating wire elements and (b) a power supply cable comprising a ground conductor and power supply conductors. The electrical and mechanical connection comprises:
  a zone of interconnection between the shielded heating cable and the power supply cable;
  in the interconnection zone, a first connection between a free end of the metal sheath and a free end of the ground conductor; and
  in the interconnection zone, second connections between free ends of the heating wire elements and free ends of the power supply conductors, respectively;
  wherein, in the interconnection zone, the interconnected metal sheath and ground conductor have a first length shorter than second lengths of the interconnected heating wire elements and power supply conductors whereby, in operation, longitudinal tension in the interconnection zone is totally supported by the interconnected metal sheath and ground conductor.

The foregoing and other objects, advantages and features of the present invention will become more apparent upon reading of the following non-restrictive description of illustrative embodiments thereof, given by way of example only with reference to the accompanying drawings.

BRIEF DESCRIPTION OF THE DRAWINGS

In the appended drawings:

FIG. 1 is a side elevational view of a non-restrictive illustrative embodiment of the present invention, showing an interconnection zone between a shielded heating cable and a power supply cable.

DETAILED DESCRIPTION OF THE ILLUSTRATIVE EMBODIMENT

The non-restrictive illustrative embodiment of the method and connection according to the present invention, for electrically and mechanically connecting a shielded heating cable with a power supply cable will now be described with reference to FIG. 1.

Although the present invention will be described in relation to connection of a shielded heating cable with a power supply cable, it should be kept in mind that it is within the scope of the present invention to apply the same concept to other types of multi-conductor cables.

Shielded Heating Cable 1

Referring to FIG. 1, the shielded heating cable, generally identified by the reference 1 comprises:
  a pair of spirally twisted heating wire elements 11 and 12;
  a metal sheath 13 enclosing the pair of spirally twisted heating wire elements 11 and 12; and
  an insulating jacket 14 covering the metal sheath 13.
  Heating Wire Element 11

The heating wire element 11 comprises a resistance wire 111 covered with insulation 112.

The resistance wire 111 has an electrical resistance (resistance by unit of length of resistance wire) dependent on the diameter of the wire 111. More specifically, the electrical resistance of the resistance wire 111 is adjusted, taking into consideration the total length of the heating wire element 11 in a typical installation, to release a given amount of heat when supplied with alternating current from, for example, a 120-Volt 60-Hz voltage source commonly found in residential, industrial and commercial buildings.

The resistance wire 111 can be made of copper, or another electrically conductive material, for example an electrically conductive metal other than copper, or an electrically conductive metal alloy including copper and/or any other suitable metal(s).

The insulation 112 of the heating wire element 11 can be made of extruded plastic material such as polyethylene or polypropylene capable of withstanding and conducting the heat generated by and released from the resistance wire 111.

Heating Wire Element 12

In the same manner, the heating wire element 12 comprises a resistance wire 121 covered with insulation 122.

The resistance wire 121 has an electrical resistance (resistance by unit of length of resistance wire) dependent on the diameter of the wire 121. More specifically, the electrical resistance of the resistance wire 121 is adjusted, taking into consideration the total length of the heating wire element 12 in a typical installation, to release a given amount of heat when supplied with alternating current from, for example, a 120-Volt 60-Hz voltage source commonly found in residential, industrial and commercial buildings.

The resistance wire 121 can be made of copper, or another electrically conductive material, for example an electrically conductive metal other than copper, or an electrically conductive metal alloy including copper and/or any other suitable metal(s).

The insulation 122 of the heating wire element 12 can be made of extruded plastic material such as polyethylene or polypropylene capable of withstanding and conducting the heat generated by and released from the resistance wire 121.

The heating wire elements 11 and 12 are spirally twisted with a given lay, this lay corresponding to the length required by the heating wire elements 11 and 12 to be spirally twisted by 1 turn. An advantage is that, by spirally twisting the heating wire elements 11 and 12, the electromagnetic field from the heating wire element 11 and the electromagnetic field from the heating wire element 12 substantially cancel each other, of course when the current has the same given amplitude in the two heating wire elements 11 and 12, and the current flowing through the heating wire element 11 flows in a direction opposite to the current flowing through the heating wire element 12.

Metal Sheath 13

The metal sheath 13 is formed of a plurality of small-diameter copper wires braided together to form a tubular shielding and/or a metal tape spirally wound or longitudinally applied. The main function of the metal sheath 13 is to ground the heating cable 1 through a connection to the ground. The metal sheath 13 is also designed to resist to impacts as strong as 100 lbs.

Of course, the metal sheath 13 will comprise braided wires and/or tape made of an electrically conductive material capable of withstanding and conducting the heat generated by and released from the resistance wires 111 and 121. Although this material could be copper, it is within the scope of the present invention to use another electrically conductive material, for example an electrically conductive metal other than copper, or an electrically conductive metal alloy including copper and/or any other suitable metal(s).

Insulating Jacket 14

The insulating jacket 14 covering the metal sheath 13 can be made of extruded plastic or elastomeric material with or without subsequent cross-linking such as polyethylene or polypropylene capable of withstanding and conducting the heat generated by and released from the resistance wires 111 and 121.

Power Supply Cable 2

Still referring to FIG. 1, the power supply cable, generally identified by the reference 2, comprises:
  an insulated ground conductor 22;
  two insulated electrical conductors 21 and 23; and
  an insulating jacket 24 enclosing the three insulated conductors 21, 22 and 23.
  Insulated Electrical Conductor 21

The insulated electrical conductor 21 comprises an electrically conductive wire 211 covered with insulation 212. The electrically conductive wire 211 can be made of copper, or of another electrically conductive material, for example an electrically conductive metal other than copper, or an electrically conductive metal alloy including copper and/or any other suitable metal(s). The insulation 212 of the insulated electrical conductor 21 can be made of extruded plastic material such as polyethylene or polypropylene.

Insulated Ground Conductor 22

The insulated ground conductor 22 comprises an electrically conductive wire 221 covered with insulation 222. The electrically conductive wire 221 can be made of copper, or of another electrically conductive material, for example an electrically conductive metal other than copper, or an electrically conductive metal alloy including copper and/or any other suitable metal(s). The insulation 222 of the insulated ground conductor 22 can be made of extruded plastic material such as polyethylene or polypropylene.

Insulated Electrical Conductor 23

The insulated electrical conductor 23 comprises an electrically conductive wire 231 covered with insulation 232. This electrically conductive wire 231 can be made of copper, or of another electrically conductive material, for example an electrically conductive metal other than copper, or an electrically conductive metal alloy including copper and/or any other suitable metal(s). The insulation 232 of the insulated electrical conductor 23 can be made of extruded plastic material such as polyethylene or polypropylene.

Insulating Jacket 24

The insulating jacket 24 enclosing the three insulated conductors 21–23 can be made of extruded plastic or elastomeric material with or without subsequent cross-linking such as polyethylene or polypropylene.

Electrical and Mechanical Connection

To electrically and mechanically connect a free end 15 of the shielded heating cable 1 to a free end 25 of the power supply cable 2, the following operations are conducted:

the insulating jacket 14 is stripped from the free end 15 of the shielded heating cable 1 to expose a free end of the metal sheath 13;

the heating wire elements 11 and 12 are withdrawn from the exposed free end of the metal sheath 13;

the insulation 112 is stripped from the free end of the heating wire element 11 to expose a free end 113 of the resistance wire 111;

the insulation 122 is stripped from the free end of the heating wire element 12 to expose a free end 123 of the resistance wire 121;

the insulation 212 is stripped from the free end of the power supply conductor 21 to exposed a free end 213 of the electrically conductive wire 211;

the insulation 222 is stripped from the free end of the ground conductor 22 to exposed a free end 223 of the electrically conductive wire 221;

the insulation 232 is stripped from the free end of the power supply conductor 23 to expose a free end 233 of the electrically conductive wire 231;

the free end 223 of the electrically conductive wire 221 of the ground conductor 22 is ultrasonically welded to the free end of the metal sheath 13 corresponding to the stripped free end 15 of the shielded heating cable;

the free ends 113 and 213 are ultrasonically welded; and the free ends 123 and 233 are ultrasonically welded.

As illustrated in FIG. 1, in a zone 3 of interconnection between the shielded heating cable 1 and the power supply cable 2, the interconnected metal sheath 13 and ground conductor 22 have a length shorter than a length of the interconnected heating wire element 11 and power supply conductor 21. Also, the interconnected metal sheath 13 and ground conductor 22 have, in the zone 3, a length shorter than a length of the interconnected heating wire element 12 and power supply conductor 23. In this manner, in operation, longitudinal tension in the interconnection zone 3 is totally supported by the interconnected metal sheath 13 and ground conductor 22.

Since the heating wire elements 11 and 12 have small-diameter, fragile resistance wires 111 and 121, the construction illustrated in FIG. 1 will protect the resistance wires 111 and 121 from rupture or other damage caused by tension in the interconnection zone 3 of the cables 1 and 2.

The loop made with each of the resistance wires 111 and 121 at the point of connection between the shielded heating cable 1 and the power supply cable 2 also provides room to relieve the stress caused by the thermal expansion of the resistance wires 111 and 112 when electrical power is applied. The resistance wires 111 and 121 having a diameter much smaller than the electrically conductive wires 211 and 231 of the power supply cable 2 (non-heating cable), without these loops, all of the expansion stress would be localized at the weakest points of the resistance wires 111 and 121, which would be the points just next to the respective connections with the electrically conductive wires 211 and 231 of the power supply cable 2. Without the loops, there would be a higher probability of having power interruptions due to the breakage of the resistance wires 111 and 121 at these particular points.

Although the non-restrictive illustrative embodiment of the present invention has been described in relation to ultrasonic welding of the wires and sheath, it should be kept in mind that it is within the scope of the present invention to use other types of welding as well as other types of connections.

Also, the interconnected heating wire element 11 and power supply conductor 21 can form a 360° loop (not shown) in the interconnection zone 3. The free wire ends 113 and 213 can then be placed side by side in the continuity of both the heating wire element 11 and power supply conductor 21 and ultrasonically welded in this position.

In the same manner, the interconnected heating wire element 12 and power supply conductor 23 can form a 360° loop (not shown) in the interconnection zone 3. The free wire ends 123 and 233 can then be placed side by side in the continuity of both the heating wire element 12 and power supply conductor 23 and ultrasonically welded in this position.

Finally, the interconnected wire free end 223 and metal sheath free end, the interconnected free ends 113 and 213, and the interconnected free ends 123 and 233 are individually insulated using conventional techniques well known to those of ordinary skill in the art. In the same manner the individually insulated interconnected wire free end 223 and metal sheath free end, interconnected free ends 113 and 213, and interconnected free ends 123 and 233 are finally globally covered with additional insulation, for example a heat-shrinkable jacket covering the interconnection zone 3 and adjacent portions of the insulating jackets 14 and 24.

Although the present invention has been described hereinabove by way of a non-restrictive illustrative embodiment thereof, this embodiment can be modified at will, within the scope of the appended claims, without departing from the spirit and scope of the present invention.

What is claimed is:

1. A method of electrically and mechanically connecting (a) a shielded heating cable comprising a metal sheath and heating wire elements with (b) a power supply cable comprising a ground conductor and power supply conductors, comprising:

connecting, in a zone of interconnection between the shielded heating cable and the power supply cable, a free end of the metal sheath with a free end of the ground conductor;

connecting, in the interconnection zone, free ends of the heating wire elements with free ends of the power supply conductors, respectively; and making, in the interconnection zone, a length of the interconnected metal sheath and ground conductor shorter than lengths of the interconnected heating wire elements and power supply conductors whereby, in operation, longitudinal tension in the interconnection zone is totally supported by the interconnected metal sheath and ground conductor.

2. The method of claim 1, wherein connecting the free end of the metal sheath with the free end of the ground conductor comprises:

ultrasonically welding the free end of the metal sheath with the free end of the ground conductor.

3. The method of claim 1, wherein connecting the free ends of the heating wire elements with the free ends of the power supply conductors comprises:

ultrasonically welding the free ends of the heating wire elements with the free ends of the power supply conductors.

4. The method of claim 1, wherein connecting the free end of the metal sheath with the free end of the ground conductor comprises:

stripping an insulating jacket of the shielded heating cable to expose the free end of the metal sheath;

withdrawing the heating wire elements from the exposed free end of the metal sheath;

stripping insulation from the free end of the ground conductor to expose a free end of an electrically conductive wire of the ground conductor; and connecting the stripped free end of the metal sheath with the exposed free end of the electrically conductive wire of the ground conductor.

5. The method of claim 4, wherein connecting the stripped free end of the metal sheath with the exposed free end of the electrically conductive wire of the ground conductor comprises:

ultrasonically welding the stripped free end of the metal sheath with the exposed free end of the electrically conductive wire of the ground conductor.

6. The method of claim 1, wherein connecting the free ends of the heating wire elements with the free ends of the power supply conductors comprises:

stripping insulation from the free ends of the heating wire elements to expose free ends of resistance wires of the heating wire elements;

stripping insulation from the free ends of the power supply conductors to expose free ends of electrically conductive wires of the power supply conductors; and connecting the exposed free ends of the resistance wires of the heating wire elements to the exposed free ends of the electrically conductive wires of the power supply conductors.

7. The method of claim 6, wherein connecting the exposed free ends of the resistance wires of the heating wire elements to the exposed free ends of the electrically conductive wires of the power supply conductors comprises:

ultrasonically welding the exposed free ends of the resistance wires of the heating wire elements to the exposed free ends of the electrically conductive wires of the power supply conductors.

8. A method of electrically and mechanically connecting (a) a first shielded cable comprising a metal sheath and electrical conductors with (b) a second cable comprising a ground conductor and electrical conductors, comprising:

connecting, in a zone of interconnection between the first and second cables, a free end of the metal sheath with a free end of the ground conductor;

connecting, in the interconnection zone, free ends of the electrical conductors of the first cable with free ends of the electrical conductors of the second cable, respectively; and making, in the interconnection zone, a length of the interconnected metal sheath and ground conductor shorter than lengths of the interconnected electrical conductors of the first cable and electrical conductors of the second cable whereby, in operation, longitudinal tension in the interconnection zone is totally supported by the interconnected metal sheath and ground conductor.

* * * * *